(12) United States Patent
Perlin (10) Patent No.: US 11,294,021 B2
(45) Date of Patent: *Apr. 5, 2022

(54) TRACKING APPARATUS AND METHOD

(71) Applicant: Kenneth Perlin, New York, NY (US)

(72) Inventor: Kenneth Perlin, New York, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/659,024

(22) Filed: Oct. 21, 2019

(65) Prior Publication Data

US 2020/0049789 A1 Feb. 13, 2020

Related U.S. Application Data

(63) Continuation of application No. 15/421,853, filed on Feb. 1, 2017, now Pat. No. 10,451,704.

(60) Provisional application No. 62/290,183, filed on Feb. 2, 2016.

(51) Int. Cl.
*G01S 3/782* (2006.01)

(52) U.S. Cl.
CPC .................. *G01S 3/782* (2013.01)

(58) Field of Classification Search
CPC ........................................ G01S 3/782
See application file for complete search history.

(56) References Cited

U.S. PATENT DOCUMENTS

| | | | |
|---|---|---|---|
| 4,779,211 A | 10/1988 | March | |
| 4,926,037 A * | 5/1990 | Martin-Lopez | H02N 11/006 250/205 |
| 5,841,133 A | 11/1998 | Omi | |
| 6,328,342 B1 | 12/2001 | Belousov | |
| 7,102,760 B2 * | 9/2006 | Yamamoto | G01D 5/38 356/499 |
| 7,414,547 B2 | 8/2008 | Wang | |
| 10,451,704 B2 * | 10/2019 | Perlin | G01S 3/782 |

* cited by examiner

*Primary Examiner* — Seung C Sohn
(74) *Attorney, Agent, or Firm* — Ansel M. Schwartz (57) ABSTRACT

A tracking apparatus includes a photosensor. The apparatus includes only a single, physically compact, optical pattern emitting base station. The apparatus includes a computer that tracks the photosensor to sub-millimeter accuracy using the optical pattern emitted by the base station. Alternatively, the computer determines angular position of the photosensor relative to the base station to a finer resolution than the size of an aperture of the photosensor from the light emitted by the base station. A method for tracking.

14 Claims, 6 Drawing Sheets

TRACKING APPARATUS AND METHOD

CROSS-REFERENCE TO RELATED APPLICATIONS

This is a continuation of U.S. patent application Ser. No. 15/421,853 filed Feb. 1, 2017, now U.S. Pat. No. 10,451, 704, which is a nonprovisional of U.S. provisional application Ser. No. 62/290,183 filed Feb. 2, 2016, all of which are incorporated by reference herein.

FIELD OF THE INVENTION

The present invention is related to tracking an object with a photosensor on the object using a single base station that emits light that is received by the photosensor. (As used herein, references to the "present invention" or "invention" relate to exemplary embodiments and not necessarily to every embodiment encompassed by the appended claims.). More specifically, the present invention is related to tracking an object with a photosensor on the object using a single base station that emits light that is received by the photosensor where the light gas macro-patterns and micro-patters that are used for identifying the position of the photosensor and thus the object.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Systems that optically track the position of a target have many uses, including inventory control, security, movement analysis and virtual reality. Some of these systems, such as the Valve/HTC Lighthouse [Deyle 2015] and the Instant Replay system of Raskar et al [Raskar 2006] use small photosensors on the object to be tracked. One or more fixed location base stations emit time-varying patterns of angularly structured light into the scene. The resulting time-varying light intensity measured at each photosensor is used to calculate the angle of that photosensor with respect to the origin point of that transmitted pattern.

Two orthogonally oriented patterns emitted sequentially from the same base station can then be used to compute the solid angle of the photosensor from that base station. Tri-angulation to compute the three dimensional position of the photosensor in the scene can then be effected through the use of two or more base stations in different locations, or by placing multiple photo-sensors in different known locations on a shared rigid body to be tracked.

These two systems have the benefit that the target photosensors are small, and therefore can be placed unobtrusively on objects to be tracked, or placed in multiple locations on non-rigid objects, such as the bodies or clothing of people to be tracked. For example, either system can be used to track the position of a wand that is drawing in the air in a virtual reality simulation. In this application a photosensor can be placed at the tip of the wand to be tracked.

In another example, either system can be used to track the position and orientation of a virtual reality head mounted display (HMD). In this application a number of photosensors can be placed on different known locations of the HMD. Once the location of each photosensor has been determined, then a "best fit" rigid body can be readily computed from the measured locations of these individual photosensors.

Each of these two systems suffers from practical limitations in measurable angular resolution, due to limitations on practical optical resolution in different parts of the system. The Lighthouse system requires a linear sweep of the scene by a scanning laser line for each angular dimension to be measured. The specific moment in time during this sweep when the scanning line impinges on a photosensor target is used to compute the angular position of that photosensor in the dimension of the sweep, with respect to the emitting base station.

This approach has a resolution limitation due to the fact that the sweep needs to be fast enough for real-time tracking. The Lighthouse system does a complete measurement 60 times per second. This requires four sweeps (one horizontal followed by one vertical for each of two base stations).

This constraint puts a large burden on the timing circuitry on the receiving end that converts detection time to position. Practically this limitation results in a final positional accuracy within the scene that cannot be smaller than about 10 millimeters, for targets that are on the order of two meters away from the base stations.

The Instant Replay system projects a discrete Gray code pattern out to the scene in ten sequential steps (one per binary bit), to determine angular resolution in each dimension. This system has the advantage over the Lighthouse that angular positional resolution is exponential in time: Only n discrete time steps are required to measure $2^n$ discrete angular positions.

In practice, Instant Replay uses 10 sequentially projected bit patterns to encode $10^2$, or 1024, angular positions. Yet this nominal highest angular resolution is achieved only if the receiving aperture of the photosensor is smaller than the pattern detail size at the finest resolution (lowest order bit) of the projected Gray code pattern.

The measurable angular resolution is therefore limited by the size of the optical aperture formed by the photosensor, which in a practical implementation needs to be large enough to gather sufficient light to guarantee an acceptably high signal to noise ratio. Pattern detail that is smaller than the size of the receiving aperture cannot be accurately detected.

BRIEF SUMMARY OF THE INVENTION

The present invention pertains to a tracking apparatus. The apparatus comprises a photosensor. The apparatus comprises only a single, physically compact, optical pattern emitting base station. The apparatus comprises a computer that tracks the photosensor to sub-millimeter accuracy using the optical pattern emitted by the base station.

The present invention pertains to a tracking apparatus. The apparatus comprises a photosensor having an aperture. The apparatus comprises a light emitting base station. The apparatus comprises a computer that determines angular position of the photosensor relative to the base station to a finer resolution than the size of the aperture of the photosensor from the light emitted by the base station.

The present invention pertains to a method for tracking. The method comprises the steps of emitting an optical pattern with only a single, physically compact base station. There is the step of tracking a photosensor with a computer to sub-millimeter accuracy using the optical pattern emitted by the base station.

The present invention pertains to a method for tracking. The method comprises the steps of emitting light from a base station. There is the step of determining angular position of a photo-sensor having an aperture relative to the base station with a computer to a finer resolution than the size of the aperture of the photosensor from the light emitted by the base station.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 2:
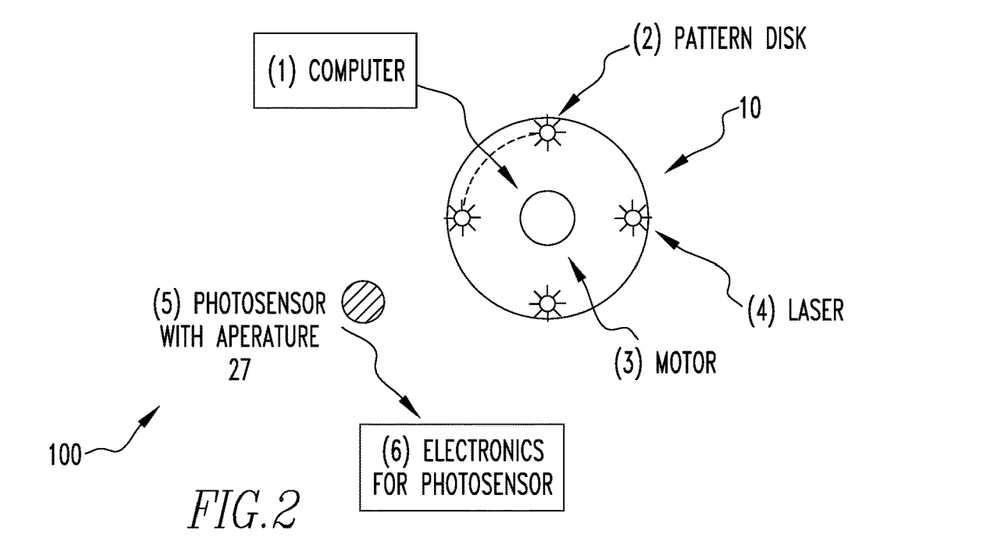
FIG. 2 is an inventory of physical parts.

Referring now to the drawings wherein like reference numerals refer to similar or identical parts throughout the several views, and more specifically to FIG. 2 thereof, there is shown a tracking apparatus 100. The apparatus 100 comprises a photosensor 5. The apparatus 100 comprises only a single, physically compact, optical pattern emitting base station 10. The apparatus 100 comprises a computer 1 that tracks the photosensor 5 to sub-millimeter accuracy using the optical pattern emitted by the base station 10.

The base station 10 may include a disk 2 with a motor 3 that rotates the disk 2. The disk 2 may have an outer edge 12 with a sequence of transmissive fraction patterns. There may be between 40 and 240 diffraction patterns. The base station 10 may include at least one laser 4 behind the rotating patterns of the disk 2 which emits light through the rotating patterns. The base station 10 may include 4 lasers placed at regular angular locations of 0, $\pi/2$, $\pi$ and $3\pi/2$ with respect to the disk 2.

Figure 3:
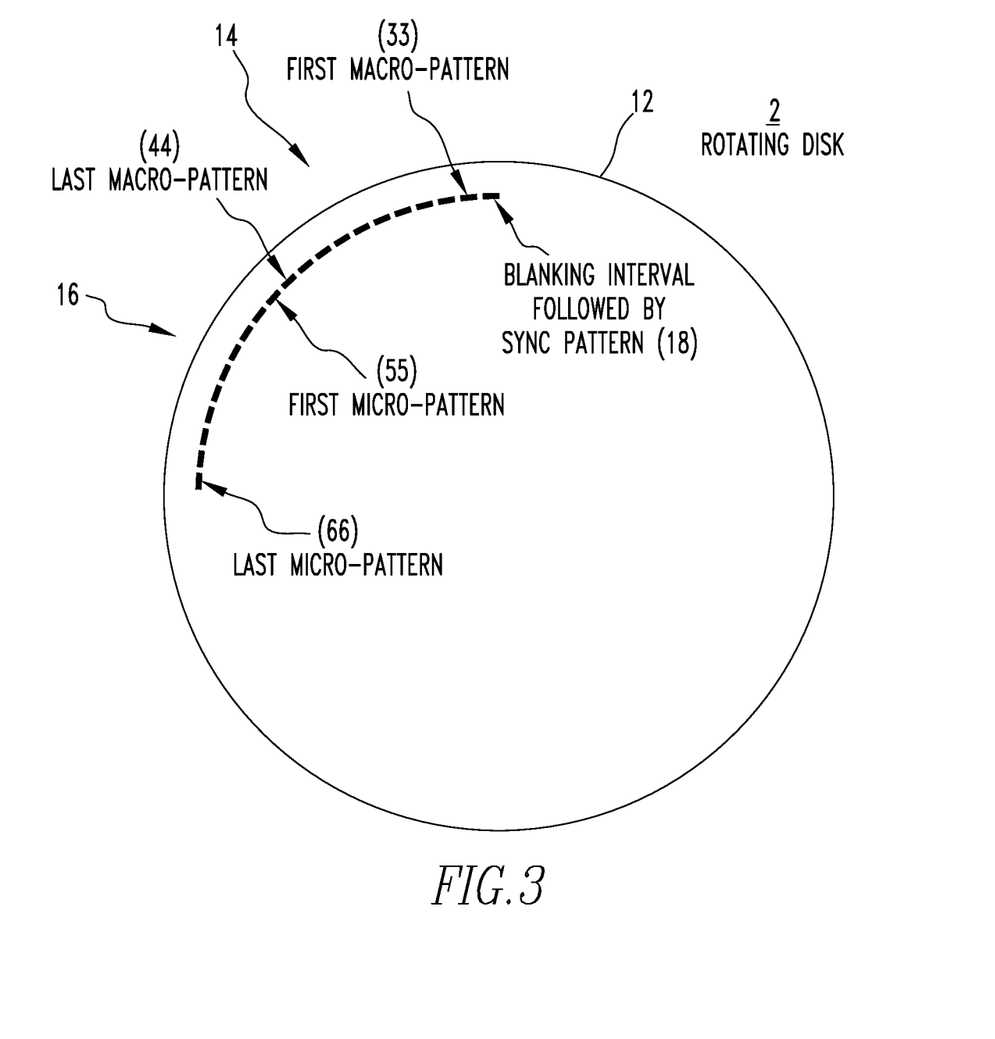
FIG. 3 shows the structure of the rotating pattern disk.
Figure 5:
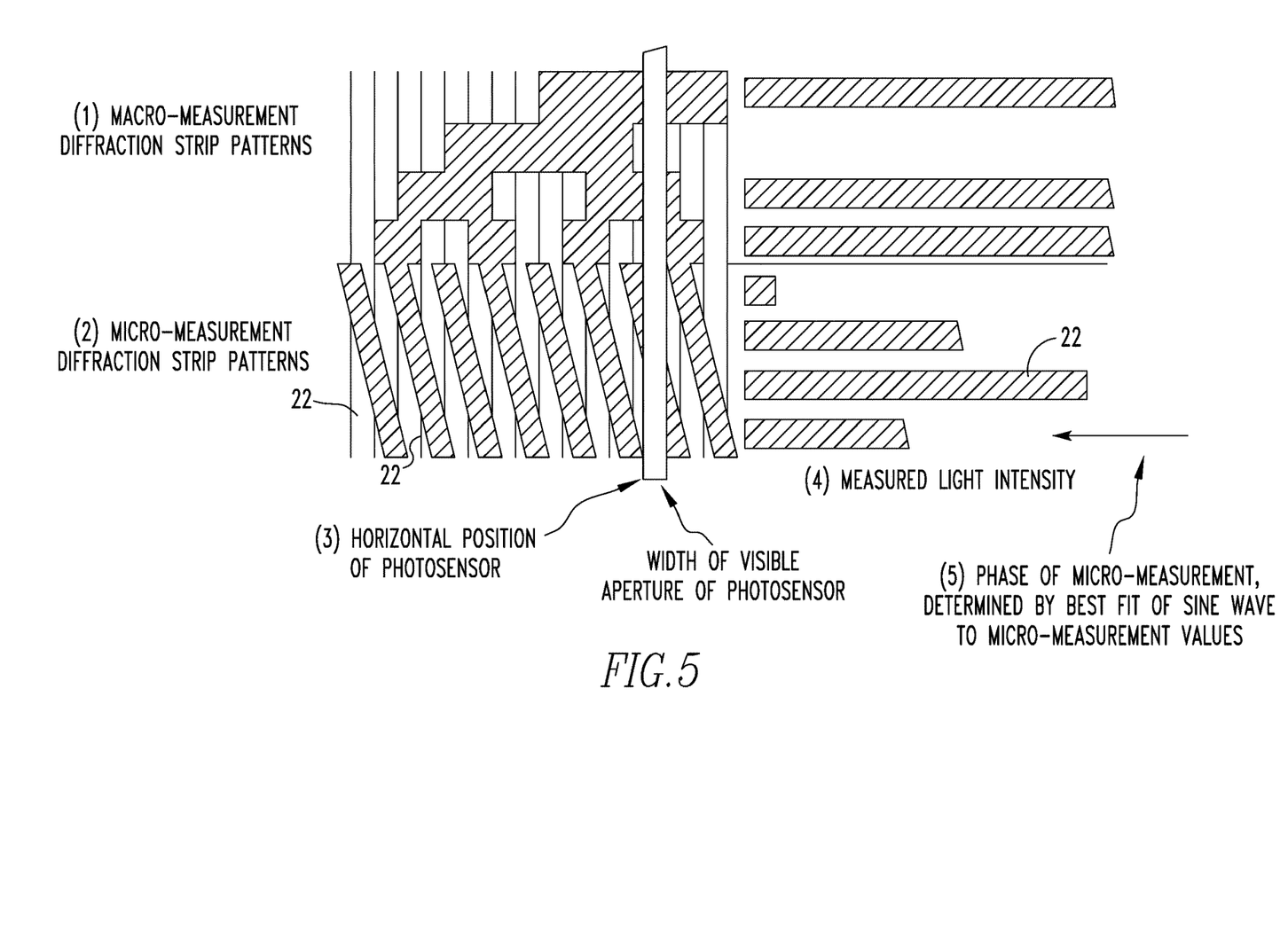
FIG. 5 shows the photosensor changing position.
Figure 6A:
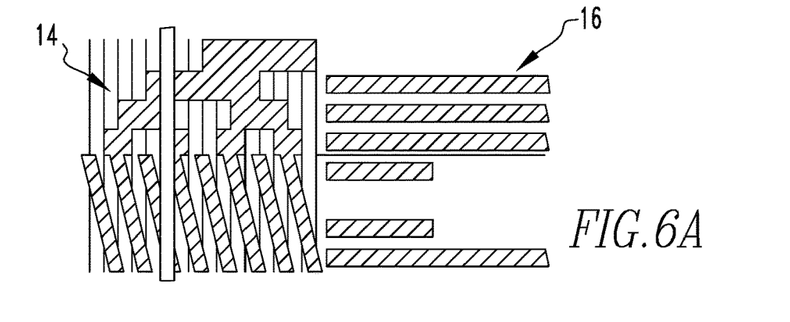
FIGS. 6A-6D show a series of patterns with both macro- and micro-measurement.
Figure 6B:
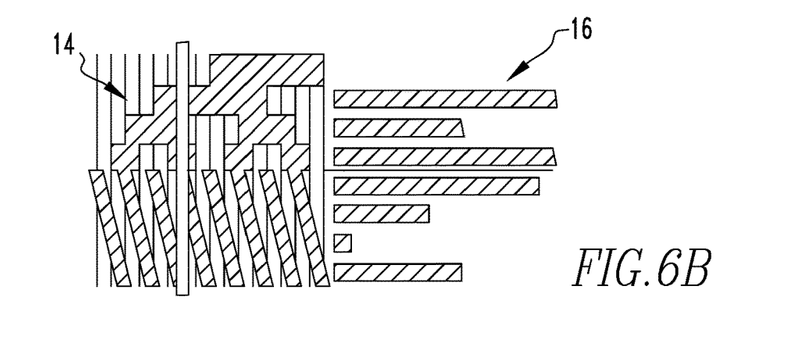
Figure 6C:
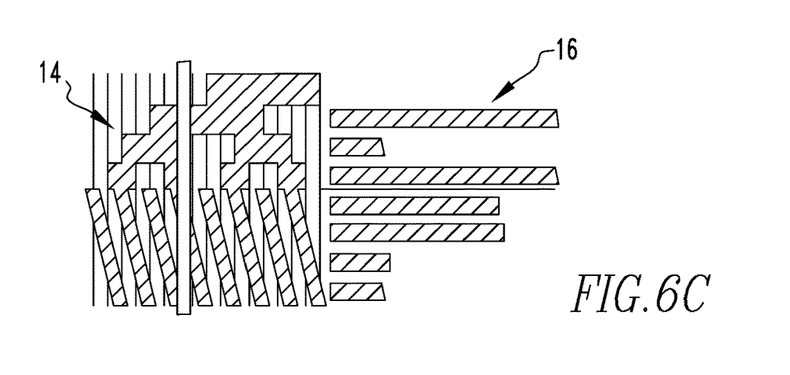
Figure 6D:
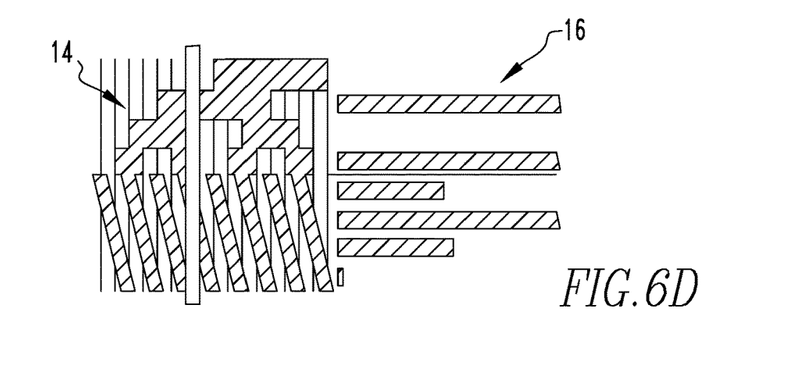

The diffraction patterns may include a first set of macro-patterns 14 for macro-measurement disposed one immediately after another, and a first set of micro-patterns 16 for micro-measurement disposed one immediately after another, each micro-pattern 16 smaller than every macro-pattern 14, as shown in FIG. 3. Each pattern may cause collimated laser 4 light which impinges upon it from behind to scatter in a structured stripe 22 pattern. Each emitted stripe 22, as shown in FIG. 5, may run perpendicular to a radius of the disk 2, and the stripe 22 pattern varies in the disk's radial direction. At least one of the diffraction patterns may be a synchronization pattern 18. There may be a blanking interval 20 between two diffraction patterns. A micro-position of the sensor may be determined by fitting a sine wave to a received time-varying micro-measurement associated with the micro-patterns 16, where a phase of the sine wave determines the micro disposition of the photosensor 5, with the phase shifting linearly with position of the photosensor 5.

The present invention pertains to a tracking apparatus 100. The apparatus 100 comprises a photosensor 5 having an aperture 75. The apparatus 100 comprises a light emitting base station 10. The apparatus 100 comprises a computer 1 that determines angular position of the photosensor 5 relative to the base station 10 to a finer resolution than the size of the aperture of the photosensor 5 from the light emitted by the base station 10.

Figure 7:
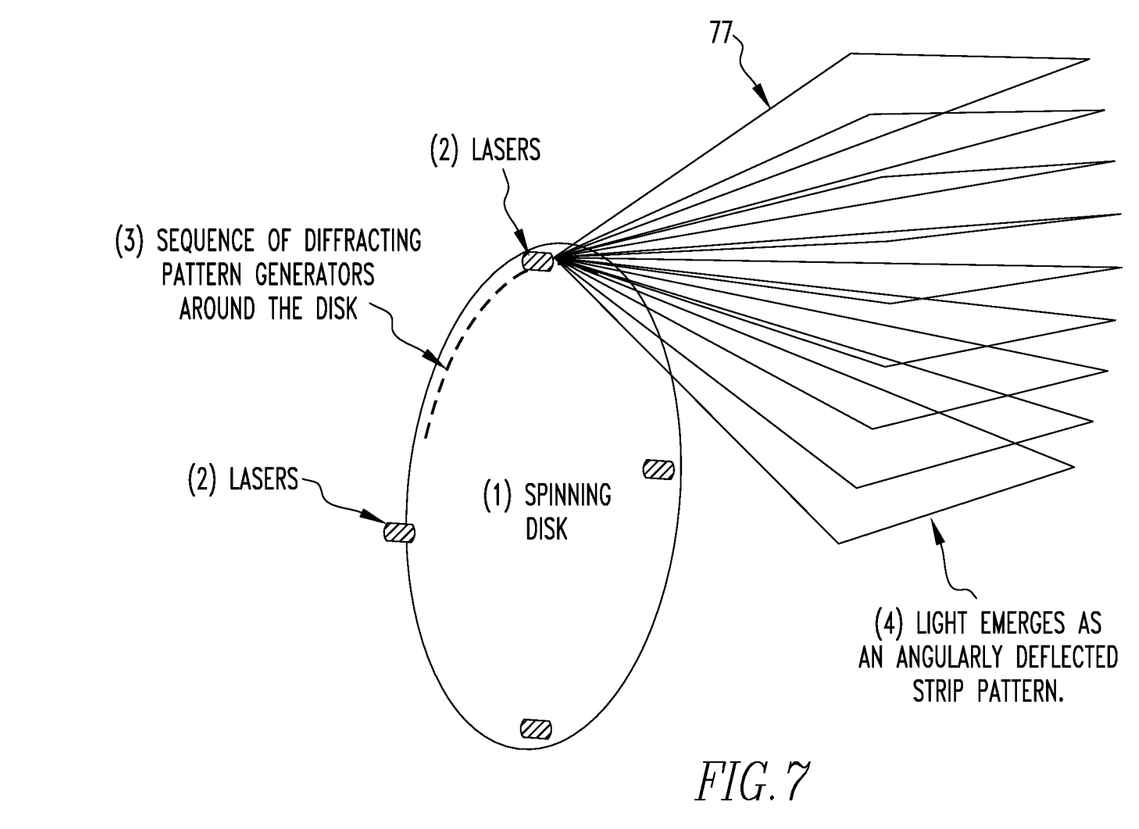
FIG. 7 shows light from laser passes through a pattern generator, sending an angularly diffracted stripe pattern into the room.

The present invention pertains to a method for tracking. The method comprises the steps of emitting an optical pattern 77, as shown in FIG. 7, with only a single, physically compact base station 10. There is the step of tracking a photosensor 5 with a computer 1 to sub-millimeter accuracy using the optical pattern emitted by the base station 10.

The present invention pertains to a method for tracking. The method comprises the steps of emitting light from a base station 10. There is the step of determining angular position of a photosensor 5 having an aperture 75 relative to the base station 10 with a computer 1 to a finer resolution than the size of the aperture 75 of the photosensor 5 from the light emitted by the base station 10.

The current invention extends the paradigm of Instant Replay so that the angular resolution of measurement along each dimension can be an order of magnitude finer than the finest resolution of the projected pattern and can also an order of magnitude smaller than the size of the receiving aperture.

Using two such angular sensors oriented orthogonally to each other, as is taught by [RASKAR 2006], a solid angular position from each base station 10 can be measured that is an order of magnitude more accurate than Instant Replay in each angular dimension. Then, as in the Lighthouse and Instant Replay systems, by deploying two or more pattern projectors which have been placed at different locations, depth can be computed from stereo disparity between these two pattern emitting base stations 10.

The order of magnitude increase in accuracy achieved by the current invention allows the distance between the base stations 10 to be an order of magnitude smaller, given the same accuracy of measured distance, than is the case for either the Lighthouse or Instant Replay systems.

Consider, for example, the case in which a wand which has been outfitted with a single photosensor 5 at its far end is being tracked by an Instant Replay system. When the wand is three meters away from the base station 10, the Instant Replay system, which has a 0.466 radian horizontal field of view, will cover an area 1.42 meters wide, since 2×tan (0.466/2)×3 m=1.42 m. Within that span it will be able to distinguish 1024 distinct locations, which gives it a horizontal positional accuracy to within about 1.42 mm at that distance. The current invention, in contrast, will have horizontal positional accuracy at that distance to about 0.14 mm.

Figure 1:
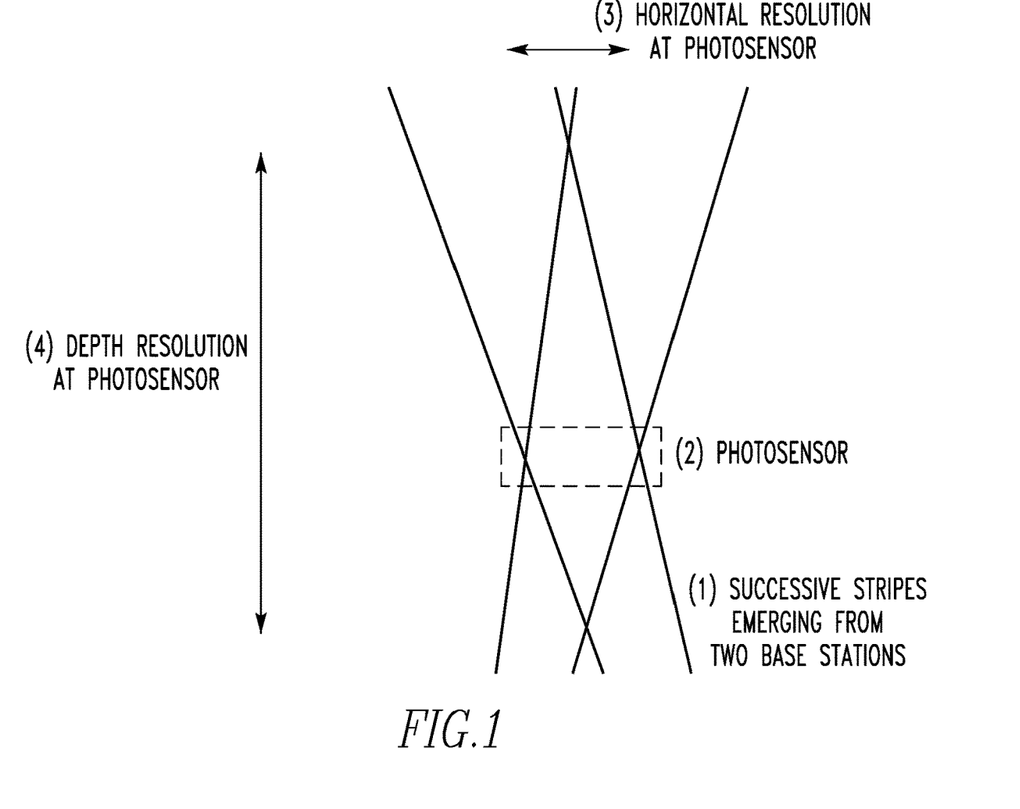
FIG. 1 shows depth position is more uncertain than horizontal position.

Consider the case where two Instant Replay systems are side by side, separated by 265 mm, which is the stereo separation distance of the two horizontally displaced laser 4 emitters of one embodiment of the current invention described below. As can be seen in FIG. 1, divergent stripe 22 patterns emerging from two base stations (1) impinge upon a photosensor 5 (2) with a horizontal resolution (3). Because the distance from the base stations to the target photosensor 5 is greater than the separation distance between the two base stations, the resolvable depth at the photosensor 5 will be more uncertain than the resolvable horizontal position. In the case de-scribed, depth uncertainty will be about 16.1 mm, which is unacceptably large for many applications, such as drawing in the air and measurement of the position of 3D objects. The current invention, in contrast, will have a depth accuracy for the same wand point to within about 1.6 mm, which is sufficiently accurate in practice for both of those applications. This is merely a representative example. The stereo separation could be, for example, 100 mm or 500 mm.

This increased positional accuracy allows full 3D tracking to be affected using a single compact base station 10, rather than requiring base stations to be separated far apart from each other. This compact form factor also allows the two pattern emitting units to be rigidly positioned with respect to each other, thereby obviating the need for calibration between the two pattern emitting units.

The physical parts consist of:
1. Computer 1
2. Pattern disk 2
3. Motor 3
4. Lasers 4
5. Photosensor 5
6. Electronics for photosensor 5

In one embodiment, under the control of computer (1), a disk (2) is rotated at 7200 rpm (120 rotations per second). This rotation can be effected by a standard motor 3 of the kind commonly found in magnetic disk drives (3). Near its outer edge 12 the rotating disk 2 contains a sequence of transmissive diffraction patterns. This is merely a representative example. Rotation could be 2000 rpm or 25000 rpm or anywhere in between and the method of operation will remain the same.

A disk 267 mm in diameter, and therefore with a circumference of 840 mm, will rotate past any fixed point at a linear velocity of 100800 mm per second (120×840 mm). If each successive diffraction pattern occupies 10 mm along the periphery of the disk 2, then 10080 discrete patterns per second will rotate past any fixed point. This is sufficient to encode 80 discrete patterns around the disk 2 circumference, plus four periodic blanking intervals 20 each rotation to maintain synchronization. Note that any of these parameters can be varied. 80 patterns around the disk 2 circumference is merely representative. 40 or 240 patterns or any appropriate number in between would also be appropriate values.

In one embodiment, four solid state lasers (4) are placed at the regular angular locations $0$, $\pi/2$, $\pi$ and $3\pi/2$ behind the rotating pattern.

The pattern disk (2) contains 20 successive diffraction patterns plus a blanking interval 20 for synchronization around a contiguous ¼ of its periphery. The sequence of patterns consists of 20 discrete patterns: 10 patterns for the macro-measurement, after [Raskar 2006], as well as 10 patterns for the micro-measurement, followed by a blanking interval 20. Each pattern causes collimated laser light which impinges upon it from behind to scatter in a structured stripe 22 pattern. In one embodiment this can be done using standard diffraction technology such as is employed in the Microsoft Kinect [Martinez 2014]. Each emitted stripe 22 runs perpendicular to the radius of the disk 2, and the stripe 22 pattern therefore varies in the disk's radial direction.

FIG. 3 shows the structure of this disk 2 in greater detail. The rotating disk 2 contains 21 diffraction patterns sequentially arranged around ¼ of its circumference. The first pattern is a synchronization pattern 18. This is followed by 10 macro-patterns 14, between a first macro-pattern 33 and a last macro-pattern 44. Finally there are 10 micro-patterns 16, between a first micro-pattern 55 and a last micro-pattern 66.

As the disk 2 rotates, this sequence of 21 patterns moves in turn past each of the four lasers 4. One complete rotation of the pattern disk 2 therefore effects a full cycle of 84 projected patterns, resulting in two horizontal pattern sequences separated by a 267.4 mm horizontal stereo base line (originating from the lasers 4 located at 0 and $\pi$ around the disk 2) and two vertical pattern sequences separated by a 267.4 mm vertical stereo base line (originating from the lasers 4 located at $\pi/2$ and $3\pi2$ around the disk 2). FIG. 7 and the text accompanying it below describes in more detail how the sequence of diffraction pattern generators moving past each laser 4 will emit angularly varying stripe 22 patterns, the light from which will then go to photosensors in the 3D space.

For the micro-measurement, the time varying phase offset can alternatively be projected as a stripe 22 pattern that shifts phase continuously over time, rather than as a sequence of discretely phase-shifted stripe 22 patterns. This alternative permits the photosensor receiver unit (5), (6) to use analog logic to fit a more precise phase shifted sinusoidal wave than might be possible with a sequence of discrete digital patterns. The 267.4 mm disk 2 diameter is merely representative. A disk 2 providing stereo separation of 100 mm or 500 mm would also be appropriate.

Step by Step Operation by User:

To the user, the operation is as follows:
1. Move the photosensor 5 to a location in the room.
2. Read where the photosensor 5 is located.

Step by Step Internal Operation in Best Embodiment:

As the spinning set of patterns rotates, it makes a succession of diffraction patterns appear in front of the laser 4. In the first "macro-measurement" portion of the pattern sequence, the macro-position is transmitted as a sequence of Gray code bit patterns, as in [RASKAR 2006]. The strength of the laser 4 can be 60 mW, as in the Microsoft Kinect [Martinez 2014], or can be a different strength, such as 20 mW or 120 mW. All things being equal, the more powerful the laser 4, the higher will be the signal to noise ratio. Yet a laser 4 which is extremely powerful might be less safe. 60 mW is a useful practical compromise between these extremes.

In the second "micro-measurement" portion of the pattern sequence, a striped pattern, with each successive on/off stripe 22 pair the same angular size as two units in the bit sequence of the macro-measurement Gray code bit pattern, shifted laterally as a linear function of fractional time within this micro-measurement. A photosensor 5 in a given location along this angular dimension will receive the different phases of the pattern as a roughly sinusoidal time-varying value.

The micro-position of the sensor is determined by fitting a sine wave to the received time-varying micro-measurement. The phase of this sine wave determines the micro-position of the photosensor 5 target. This phase will shift linearly with position of the photosensor 5 target, shifting by $\pi$ for each successive unit bit transition in the macro-measurement Gray code. This micro-position adjustment is added to the measured macro-position to produce a final higher resolution angular position along this dimension.

This two-step process is then repeated to measure angular position along the orthogonal angular dimension, to obtain a high resolution solid angle position of the photosensor 5 with respect to this base station 10. As in [Deyle 2015] and [Raskar 2006], the use of two or more offset base stations, which in one embodiment can be multiple known laser 4 emitter locations around a spinning disk 2, as well as by combining the results measured at multiple photosensor 5 locations that are at a known physical offset from each other, can then be used to construct a 3D position for each photosensor 5, as well as 3D orientation for any rigid body that contains photosensors at multiple locations.

The apparatus 100 provides for (1) Ability to track the position of a photosensor 5 target to sub-millimeter accuracy using a single, physically compact, optical pattern emitting base station 10.

(2) Ability to determine angular position of a photosensor 5 with respect to a light emitting base station 10 to a finer resolution than the size of the aperture of the photosensor 5. The aperture size, for example, can be 0.5 mm to 5 mm.

Figure 4A:
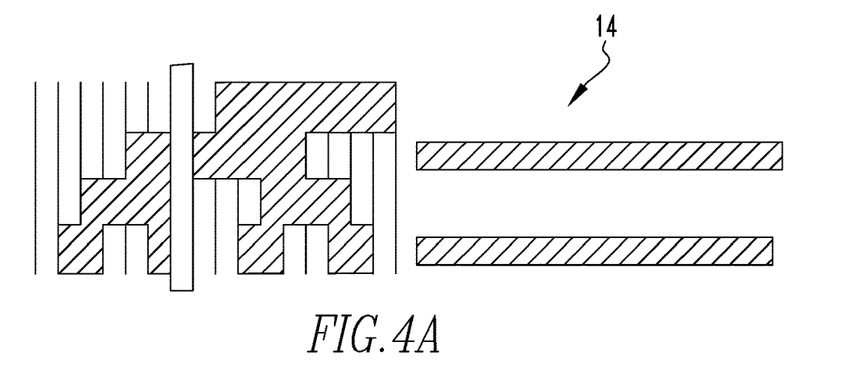
FIGS. 4A-4C show a series of micro-patterns.
Figure 4B:
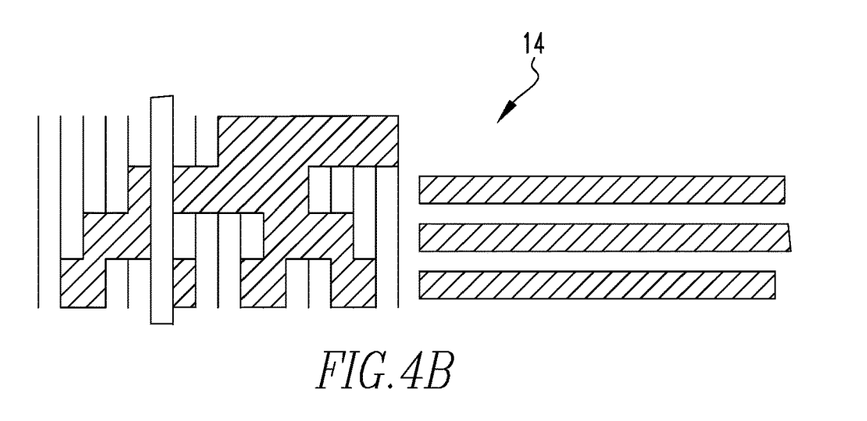
Figure 4C:
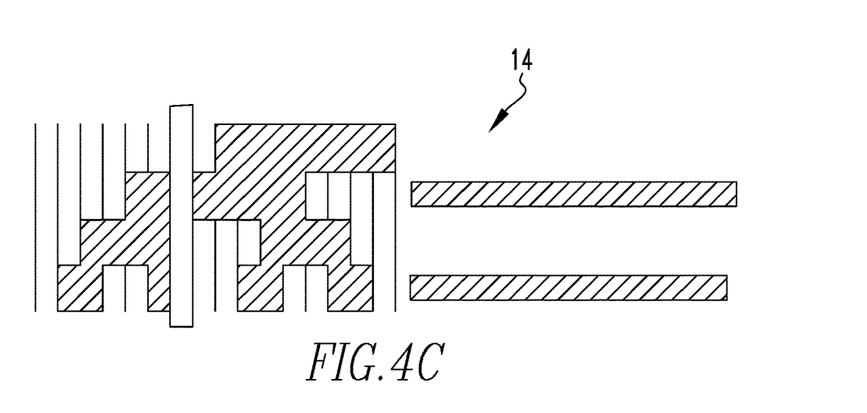

FIGS. 4A-4C show a series of micro-patterns that are used to compute the micro-position of the photosensor 5 on or with an object from the phase of a sine wave fitted to the micro measurements.

FIGS. 6A-6D show the photosensor 5 changing position by one unit, with both micro and macro measurements.

The spinning disk (1) is positioned in front of four lasers (2). As the disk 2 spins, each of its sequence of light diffracting pattern generators (3) becomes positioned, in its turn, in front of one of the lasers 4. The light from that laser 4 is then diffracted by the pattern generator into an angularly deflected stripe 22 pattern (4). This angularly patterned light will eventually impinge upon the apertures of photosensors in the room.

REFERENCES, all of which are incorporated by reference, herein:

Deyle, T: Valve's "Lighthouse" Tracking System May Be Big News for Robotics, 1015.

Martinez, M., Stiefelhagen, R., Kinect Unbiased, Image Processing (ICIP) IEEE International Conference on, 5791-5795, 2014.

Raskar et al: System and method for sensing geometric and photometric attributes of a scene with multiplexed illumination and solid states optical devices U.S. Pat. No. 8,009,192 B2, 2006.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A tracking apparatus comprising:
a photosensor;
only a single, physically compact, optical pattern emitting base station; and
a computer that tracks the photosensor to sub-millimeter accuracy using the optical pattern emitted by the base station.

2. The apparatus of claim 1 wherein the base station includes a disk with a motor that rotates the disk.

3. The apparatus of claim 2 wherein the disk has an outer edge with a sequence of transmissive fraction patterns.

4. The apparatus of claim 3 wherein there are between 40 and 240 diffraction patterns.

5. The apparatus of claim 4 wherein the base station includes at least one laser behind the rotating patterns of the disk which emits light through the rotating patterns.

6. The apparatus of claim 5 wherein the base station includes 4 lasers placed at regular angular locations of 0, $\pi/2$, $\pi$ and $3\pi/2$ with respect to the disk.

7. The apparatus of claim 6 wherein each pattern causes collimated laser light which impinges upon it from behind to scatter in a structured stripe pattern.

8. The apparatus of claim 7 wherein each emitted stripe runs perpendicular to a radius of the disk, and the stripe pattern varies in the disk's radial direction.

9. The apparatus of claim 8 wherein at least one of the diffraction patterns is a synchronization pattern.

10. The apparatus of claim 9 wherein there is a blanking interval between two diffraction patterns.

11. The apparatus of claim 10 wherein a micro-position of the photosensor is determined by fitting a sine wave to a received time-varying micro-measurement associated with the micro-patterns, where a phase of the sine wave determines the micro disposition of the photosensor, with the phase shifting linearly with position of the photosensor.

12. A tracking apparatus comprising:
a photosensor having an aperture;
a light emitting base station; and
a computer that determines angular position of the photosensor relative to the base station to a finer resolution than the size of the aperture of the photosensor from the light emitted by the base station.

13. A method for tracking comprising the steps of:
a photosensor;
emitting an optical pattern with only a single, physically compact base station; and
tracking the photosensor with a computer to sub-millimeter accuracy using the optical pattern emitted by the base station.

14. A method for tracking comprising the steps of:
emitting light from a base station; and
determining angular position of a photosensor having an aperture relative to the base station with a computer to a finer resolution than the size of the aperture of the photosensor from the light emitted by the base station.

* * * * *